US005469325A

United States Patent [19]
Evans

[11] Patent Number: 5,469,325
[45] Date of Patent: * Nov. 21, 1995

[54] CAPACITOR

[75] Inventor: David A. Evans, Seekonk, Mass.

[73] Assignee: Evans Findings Co., East Providence, R.I.

[*] Notice: The portion of the term of this patent subsequent to Nov. 29, 2011, has been disclaimed.

[21] Appl. No.: 282,229

[22] Filed: Jul. 29, 1994

Related U.S. Application Data

[63] Continuation-in-part of Ser. No. 35,224, Mar. 22, 1993, Pat. No. 5,369,547.

[51] Int. Cl.$^6$ ............................................. H01G 9/025
[52] U.S. Cl. ..................... 361/526; 361/525; 361/532; 361/535; 361/541; 361/517
[58] Field of Search ........................... 361/522, 523, 361/524, 525, 526, 528, 529, 532, 535, 540, 541, 503, 517

[56] References Cited

U.S. PATENT DOCUMENTS

| | | | |
|---|---|---|---|
| 2,236,270 | 3/1941 | Katzman | 361/506 |
| 3,531,693 | 9/1970 | Buice | 361/516 |
| 3,632,498 | 1/1972 | Beer | 204/290 F |
| 4,184,192 | 1/1980 | Yoshida et al. | 29/25.03 |
| 4,245,275 | 1/1981 | Cannon | 361/516 |
| 4,408,259 | 10/1983 | Muranaka et al. | 361/502 |
| 4,766,522 | 8/1988 | McHardy et al. | 361/501 |
| 4,780,769 | 10/1988 | Fukuda et al. | 361/525 |
| 4,780,797 | 10/1988 | Libby | 361/516 |
| 4,803,596 | 2/1989 | Hellwig et al. | 361/525 |
| 4,942,500 | 7/1990 | Libby et al. | 361/516 |
| 5,043,849 | 8/1991 | Libby | 361/516 |
| 5,098,485 | 3/1992 | Evans | 148/272 |
| 5,230,712 | 7/1993 | Matthews | 29/25.03 |
| 5,369,547 | 11/1994 | Evans | 361/522 |

FOREIGN PATENT DOCUMENTS

| | | |
|---|---|---|
| 0078404 | 5/1983 | European Pat. Off. . |
| 513282 | 5/1993 | Japan . |
| 56840 | 5/1993 | Japan . |

OTHER PUBLICATIONS

Raistrick et al, "Transition Metal Oxide Electrochemical Capacitors", Proceedings of Electrochemical Society Symposium on Electroceramimcs, Hawaii, Oct. 1987.
Raistrick, invited chapter entitled "Electrochemical Capacitors" Jan. 1990, pp. 1–39.
McHardy, "Electrochemical Capacitors", American Institute of Aeronautics and Astronautics, Inc.,1987, pp. 306–308.
Oxley, "High–Rate, Solid–State Electrochemical Capacitors", IEEE, 1990, pp. 346–350.
Raistrick et al, "Electrical Response of Electrochemical Capacitors Based on High Surface Area Ruthenium Oxide Electrodes", Electrochemical Society Proceedings.
Libby, "Counterelectrode Preparation For An Improved Tantalum Electrolytic Capacitor Meeting The Requirements Of MIL–C–39006/26, 27", pp. 134–138.

Primary Examiner—Teresa J. Walberg
Assistant Examiner—Gregory L. Mills
Attorney, Agent, or Firm—Leydig, Voit & Mayer

[57] ABSTRACT

A capacitor includes a cathode having a porous coating including an oxide of one of ruthenium, iridium, nickel, rhodium, platinum, palladium, and osmium, an anode including a metal selected from the group consisting of tantalum, aluminum, niobium, zirconium, and titanium, spaced from the porous coating, and an electrolyte in contact with the porous coating and the anode.

15 Claims, 4 Drawing Sheets

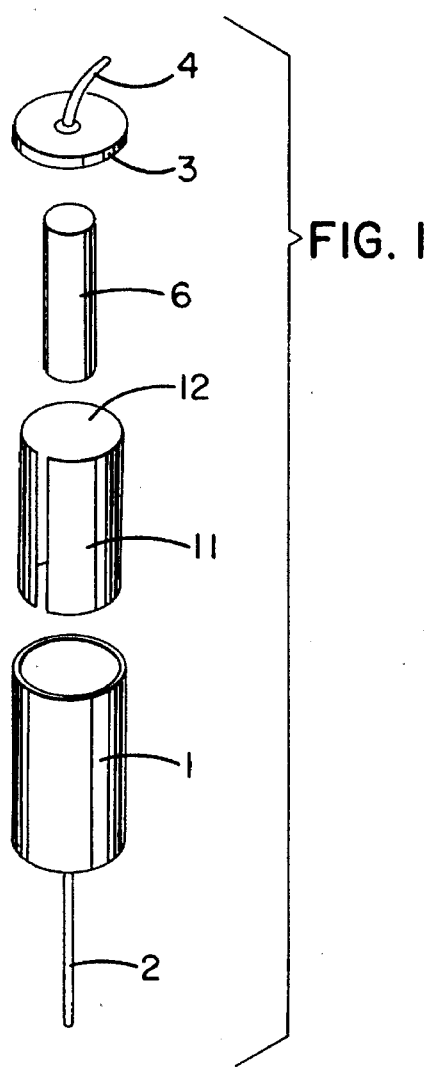
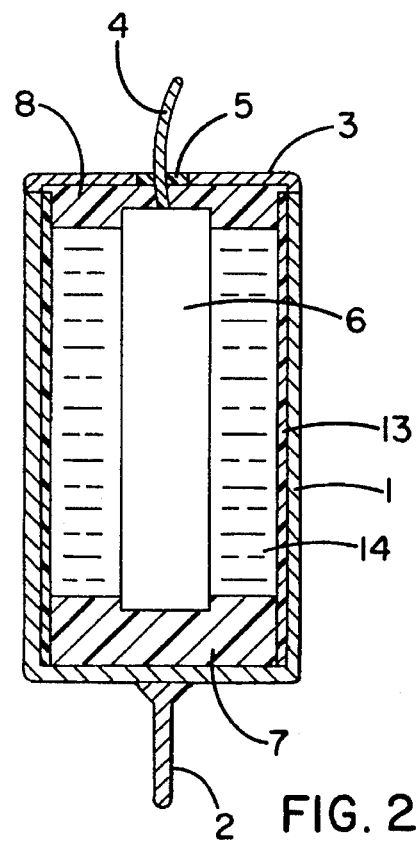
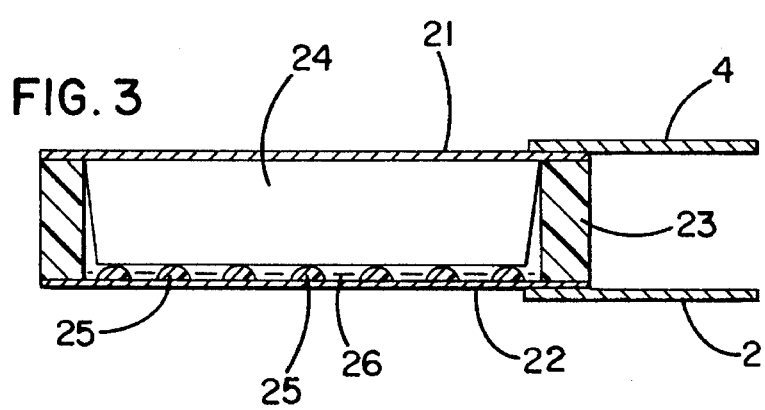

CAPACITOR

This disclosure is a continuation-in-part of U.S. patent application Ser. No. 08/035,224, filed Mar. 22, 1993, now U.S. Pat. No. 5,369,547, the disclosure of which is incorporated herein by reference.

FIELD OF THE INVENTION

The present invention concerns improved capacitors and particularly capacitors employing a pseudo-capacitor-type cathode and a wet slug-type capacitor anode to achieve improved performance including increased energy storage density.

BACKGROUND OF THE INVENTION

Tantalum wet slug capacitors have long been known in the capacitor arts. An example of the structure of a wet slug tantalum capacitor is described in U.S. Pat. No. 4,780,797. Fundamentally, as described there, the wet slug capacitor includes a tantalum or tantalum-plated container that is the cathode or negative terminal of the electrolytic capacitor. An electrolyte and a porous sintered tantalum anode are disposed within the container. Tantalum forms a native oxide on exposed surfaces that may be increased in thickness by anodic oxidation. In the conventional wet slug capacitor, both the anode and cathode have insulating tantalum oxide coatings that are spaced apart from each other but are both in contact with the electrolyte, typically a sulfuric acid solution. Since sulfuric acid is electrically conductive, a conductor-insulator-conductor structure including metal, oxide coating, and electrolyte is present at both the anode and the cathode. Each of these conductor-insulator-conductor structures is itself a capacitor, i.e., an anode capacitor and a cathode capacitor. The capacitances of these electrode capacitors are to some degree determined by the thickness of the oxide layers formed on the anode and the cathode. Increasing the thickness of the anode oxide layer but not the cathode oxide layer, for example, by anodic oxidation, increases the breakdown voltage that a wet slug capacitor can withstand but reduces the overall capacitance of the capacitor. Typical breakdown voltages for a single capacitor can range from ten to one hundred twenty-five volts.

In the wet slug capacitor, the anode capacitance is effectively electrically connected in series with the cathode capacitance. As is well known, the net capacitance of two capacitors connected in series is smaller than the smaller of the capacitances of the two capacitors. Because the oxide layer at the anode of a wet slug capacitor is usually much thicker than the thickness of the oxide layer at the cathode, the anode capacitance of a wet slug capacitor is smaller than the cathode capacitance. For example, in a typical structure, the anode capacitance may be 3,100 microfarads and the cathode capacitance may be 8,700 microfarads. The resulting net capacitance of that capacitor is about 2,300 microfarads.

Although wet slug capacitors having useful capacitances and breakdown voltages can be readily produced, there is always a desire to increase the capacitance per unit volume of those capacitors, i.e., the energy storage density, without a reduction in the breakdown voltage. One proposed method of increasing the energy storage density of a wet slug capacitor is described in the cited patent. In that patent, a number of metallic films are deposited on the inside of the container of the capacitor. In particular, it is suggested that a film selected from the platinum group of metals, i.e., ruthenium, rhodium, palladium, and platinum, be alloyed with the tantalum of the container in segregated islands where the native oxide has been removed from the tantalum. Various techniques can be employed to deposit the platinum group metal, such as sputtering and electrolytic or electroless plating, followed by a heat treatment at a relatively high temperature, for example, from 925° C. to 1,500° C. Preferably, a platinum group metal layer is subsequently deposited on the islands to form a spongy layer. The platinum group metals apparently improve the energy storage density of capacitors having the structure described in the patent.

In U.S. Pat. No. 4,942,500, a platinum group metal is applied to a capacitor cathode by cladding, i.e., by rolling a very thin layer of the platinum group metal with the tantalum metal. Explosive bonding is also mentioned. In U.S. Pat. No. 5,043,847, electrolytic co-deposition of a base metal and platinum group metal on the inside surface of a wet slug capacitor container is described. Addition of the platinum group metal by these techniques is said to increase the energy storage density.

A different type of electrolytic capacitor, frequently referred to as an electrochemical capacitor, employs so-called pseudocapacitive electrodes. These capacitors generally have metal oxide electrodes including a substrate of titanium or tantalum. Typically, a hydrated chloride of the metal, which may be ruthenium, is dissolved in isopropyl alcohol and applied to a heated titanium or tantalum substrate. The heat drives off the solvent, resulting in the deposition of a metal chloride. That chloride is heated to a high temperature in air to convert the metal chloride to an oxide. For example, the metal chloride film may be heated to about 250° C. for approximately one-half hour to completely remove the solvent and to drive off water. Thereafter, in a second elevated temperature step, for example, at approximately 300° C., a high surface area film of the oxide of the metal, for example, ruthenium oxide, is formed on the substrate. The oxide film is highly porous, meaning that it has a very high surface area. An electrochemical capacitor includes such electrodes as the anode and as the cathode, typically with a sulfuric acid solution electrolyte. The electrical charge storage mechanism is not yet fully understood. Electrical charges may be stored on the very large surface areas of the two electrodes, providing the capacitance characteristic. Electrical charges may be stored by a reversible change in the oxidation state of a material in an electrode. No matter what the charge storage mechanism is, it is substantially different from the charge storage mechanism of a wet slug capacitor electrode.

Although electrochemical capacitors can provide much higher energy storage densities than wet slug capacitors, the breakdown voltage of individual cell electrochemical capacitors is very low, typically only about one volt, i.e., essentially the dielectric breakdown voltage of the electrolyte. Even if electrochemical capacitors are connected in series, it is difficult to produce a practical capacitor with a breakdown voltage comparable to the breakdown voltages of wet slug capacitors. Thus, electrochemical capacitors have not found wide usage.

SUMMARY OF THE INVENTION

It is an object of the invention to provide an improved capacitor having a practical breakdown voltage and a high energy storage density.

According to one aspect of the invention, a capacitor comprises a cathode including a porous coating of an oxide of at least one metal selected from the group consisting of ruthenium, iridium, nickel, rhodium, platinum, palladium, and osmium, an anode spaced from the porous coating and including a metal selected from the group consisting of tantalum, aluminum, niobium, zirconium, and titanium and spaced from the porous coating, and an electrolyte disposed between and in contact with the porous coating and the anode.

According to another aspect of the invention, a capacitor comprises a first metal body, a cathode comprising a porous coating including an oxide of at least one metal selected from the group consisting of ruthenium, iridium, nickel, rhodium, platinum, palladium, and osmium disposed on the first metal body, an anode including a metal selected from the group consisting of tantalum, aluminum, niobium, zirconium, and titanium disposed on a second metal body opposite and spaced from the first metal body, and an electrolyte disposed between and in contact with the porous coating and the anode.

According to yet another aspect of the invention, a capacitor includes a plurality of capacitor cells, each cell including a first metal body having opposed first and second surfaces; a cathode comprising a porous coating including an oxide of at least one metal selected from the group consisting of ruthenium, iridium, nickel, rhodium, platinum, palladium, and osmium disposed on the first surface of said first metal body; an anode including a metal selected from the group consisting of tantalum, aluminum, niobium, zirconium, and titanium disposed on the second surface of the first metal body; an electrolyte in contact with the cathode opposite the first metal body wherein the plurality of the capacitor cells are disposed in a serial arrangement, the electrolyte of one cell contacting the second surface of each first metal body and a first surface of the first metal body of the next adjacent cell; a second metal body having first and second opposed surfaces disposed at one end of the serial arrangement and including a cathode comprising a porous coating including an oxide of at least one metal selected from the group consisting of ruthenium, iridium, nickel, rhodium, platinum, palladium, and osmium disposed on one side of the second metal body and opposite an anode of a first metal body in the serial arrangement, but no anode, and functioning as a cathode of the capacitor and an electrolyte disposed between and contacting the porous coating of the second metal body and the anode of the opposite first metal body in the serial arrangement; and a third metal body having first and second opposed surfaces and disposed at the other end of the serial arrangement and including an anode comprising a metal selected from the group consisting of tantalum, aluminum, niobium, zirconium, and titanium disposed on one side of the third metal body and opposite a porous coating of a first metal body in the serial arrangement, but no porous coating, and functioning as an anode of the capacitor and an electrolyte disposed between and contacting the anode of the third metal body and the porous coating of the opposite first metal body in the serial arrangement.

In the invention, one electrode of a capacitor is an wet slug capacitor-type electrode, for example, the anode. The other electrode is an electro-chemical-type capacitor electrode employing a porous coating including an oxide of at least one metal selected from the group consisting of ruthenium, iridium, nickel, rhodium, platinum, palladium, and osmium. For the same capacitance value, the cathode of a capacitor according to the invention is reduced in size compared to a conventional wet slug capacitor electrode. If the volume of the conventional wet slug capacitor for a particular capacitance is maintained, then the anode of a capacitor according to the invention can be increased in size relative to the conventional wet slug capacitor anode, increasing the capacitance and the energy storage density as compared to a conventional wet slug capacitor. In addition, if the capacitance of a conventional wet slug capacitor is maintained, then the volume of a corresponding capacitor according to the invention can be made smaller than the conventional wet slug capacitor, increasing energy storage density. A high breakdown voltage, characteristic of the conventional wet slug capacitor, is obtained in the invention because of the presence of the conventional wet slug capacitor anode while realizing increased energy storage density because of the presence of the pseudocapacitor cathode.

BRIEF DESCRIPTION OF THE DRAWINGS

FIG. 1 is an exploded view of a capacitor according to an embodiment of the invention;

FIG. 2 is a cross-sectional view of an alternative embodiment of a capacitor according to the invention;

FIG. 3 is a cross-sectional view of a single cell prismatic capacitor according to an embodiment the invention;

DESCRIPTION OF PREFERRED EMBODIMENTS

Figure 4:
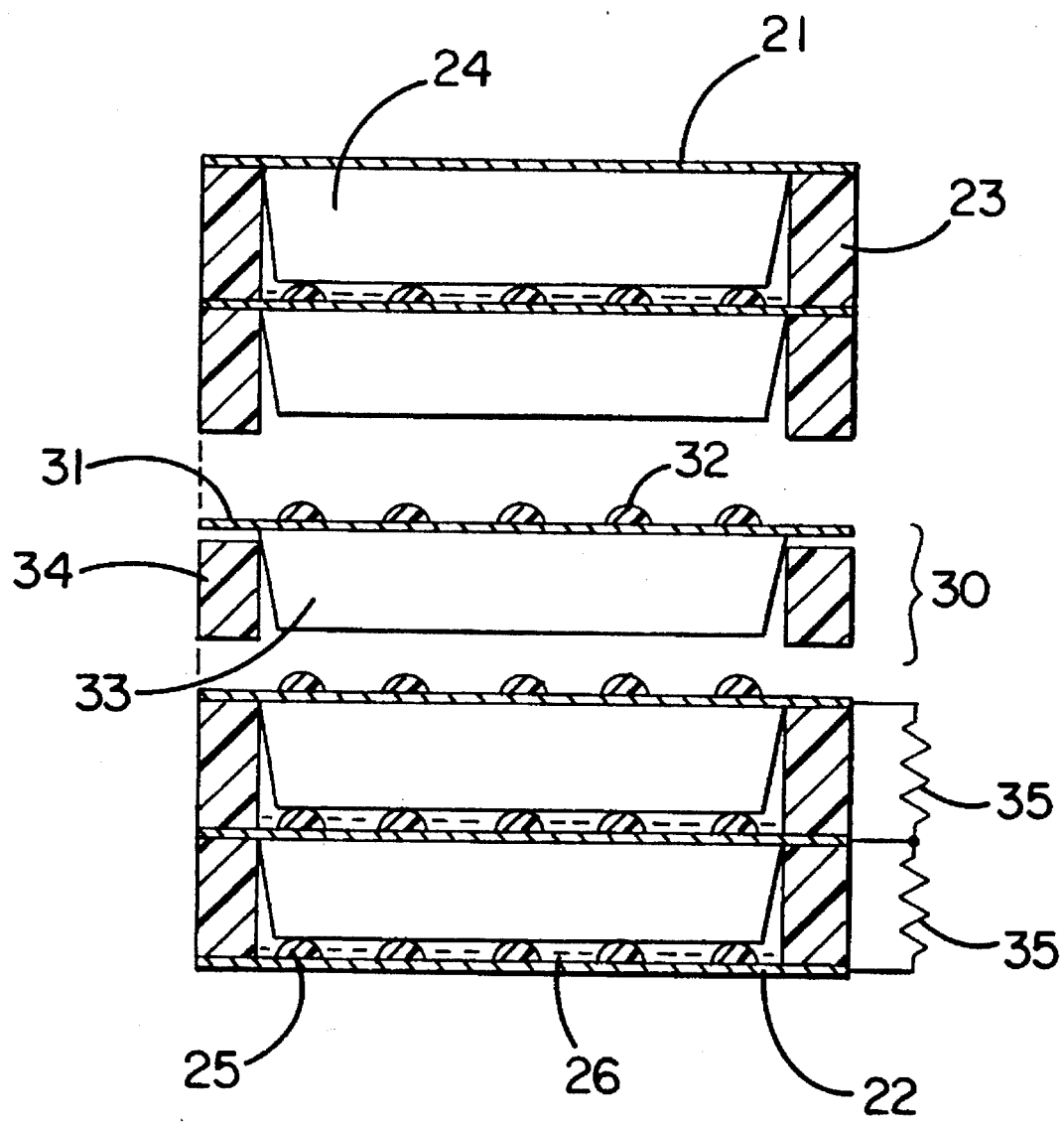
FIG. 4 is a cross-sectional view of a multiple cell prismatic capacitor according to an embodiment of the invention.

FIG. 1 is an exploded view of an embodiment of the invention and FIG. 2 is a cross-sectional view of another embodiment of the invention. Like reference numerals are used in those and all other figures to designate the same elements.

In FIG. 1, a capacitor according to the invention includes a metal container 1, typically a tantalum container. However, metals other than tantalum may be used in embodiments of the invention. Typically, the container 1 is the cathode of the capacitor and includes a lead 2 that is welded to the container. An end seal, a cap 3, includes a second lead 4 that is electrically insulated from the remainder of the cap by a feedthrough 5 seen in FIG. 2. In the assembled capacitor, the cap 3 is bonded to the container 1 by conventional means, for example, by welding. The insulating feedthrough 5 of the lead 4 is likewise conventional and may include a glass-to-metal seal through which the lead 4 passes. A conventional porous sintered tantalum anode 6 with an anodic oxide film coating is electrically connected to the lead 4 and disposed within the container 1. Direct contact between the container 1 and the anode 6 is prevented by electrically insulating spacers 7 and 8 within the container 1 that receive the ends of the anode 6. The retaining insulators 7 and 8 are conventional.

In the embodiment of the invention shown in FIG. 1, a metal body 11, such as a metal foil, is disposed within and is in electrical communication with the metal container 1. The communication may be established, for example, by welding the metal body to the inside surface of the metal container 1. The inside surface of the metal body 11 includes a porous coating 12 including a metal oxide. The porous coating preferably includes an oxide of a first metal. The first metal is selected from the transition metals in Group VIII of the Periodic Table of Elements that have at least two stable oxidation states in the electrolyte used in the capacitor. The metal is particularly selected from the group consisting of ruthenium, iridium, nickel, rhodium, platinum, palladium, and osmium. The porous coating may also include an oxide of a second metal selected from the group consisting of tantalum, titanium, and zirconium. The second metal oxide is not believed to be electrically active but increases the surface area of the porous coating and/or extends the mixture used to form the porous coating. The second metal oxide component is not essential in the capacitor cathode. In a preferred embodiment of the invention, the porous coating includes oxides of ruthenium and tantalum.

In the embodiment of the invention shown in FIG. 2, a porous coating 13, i.e., the same as the porous coating 12 of the embodiment of FIG. 1, is formed directly on the inside surface of the metal container 1. The metal body 11 employed in the embodiment of the invention shown in FIG. 1 is thus eliminated, reducing costs.

In the capacitors of FIGS. 1 and 2, each capacitor includes two electrodes. One of the electrodes, the anode 6, is preferably a conventional sintered porous tantalum anode with an oxide film coating of the type used in conventional wet slug tantalum capacitors. In addition, the anode may be made of another one of the so-called valve metals, i.e. aluminum, niobium, zirconium, and titanium. The other electrode includes the metal container 1, the metal body 11 with the porous coating 12 or the porous coating 13 on the container 1 and is similar to one of the electrodes used in a pseudocapacitor. As a result of that combination, advantages of a pseudocapacitor and of a wet slug capacitor are achieved without the disadvantages of either of those known capacitor structures. The cathode capacitance is greatly increased over the cathode capacitance of a conventional wet slug capacitor because of the very large surface area and the very small effective "plate separation". (Plate separation refers to modeling of the cathode as a theoretical parallel plate capacitor with two plates having areas A separated from each other by a distance d.) Because of the increased capacitance contributed by the pseudocapacitor cathode for a particular volume, the cathode can be reduced in size, providing space for an anode of increased size, larger than the wet slug capacitor anode of a conventional wet slug capacitor having the same capacitance. Alternatively, for the same volume as a conventional wet slug capacitor, a much larger capacitance can be achieved.

As already described with respect to one example of a conventional wet slug capacitor, a sintered anodic oxide coated tantalum anode has a capacitance of 3,100 microfarads. A pseudocapacitor cathode replacing the cathode of the conventional tantalum capacitor (having a capacitance of 8,700 microfarads) has a capacitance of 0.2 farads. Since, as in the conventional apparatus, these electrode capacitances are electrically connected in series, in the capacitor according to the invention, the overall capacitance is calculated as 3,050 microfarads, an increase in capacitance of one-third over the conventional wet slug capacitor. Measured capacitances of capacitors in accordance with the invention confirm the accuracy of this calculation.

When a voltage is applied to a capacitor according to the invention, the voltage is divided across the oxide film coating the anode and the pseudocapacitor cathode. Because the capacitance of the anode is much smaller than the capacitance of the pseudocapacitor cathode, the voltage applied to the capacitor naturally divides unequally across the electrodes. A large proportion of the applied voltage appears across the anode oxide film and not across the electrolyte. A much smaller proportion of the applied voltage appears across the pseudocapacitor electrode. As a result, a capacitor according to the invention can sustain a much higher voltage, i.e, has a much higher breakdown voltage, than a conventional pseudocapacitor. In other words, increased capacitance as observed in a pseudocapacitor is achieved in the invention without the disadvantage of the low breakdown voltage observed in those known capacitors. As well known in the art, the oxide film coating the valve metal anode, particularly a tantalum or aluminum anode, can be increased to a desired thickness, increasing the capacitor breakdown voltage, in an anodic oxidation process.

The porous coating, whether formed on a metal body or directly on the inside surface of a metal container of a capacitor according to the invention, is formed using conventional processes. Examples of methods of forming such porous coatings on metal bodies are described in numerous publications. For example, the formation of similar capacitor electrodes is described in U.S. Pat. No. 4,766,522. Electrolysis cell electrodes including similar but very thick coatings are described in some of the examples appearing in U.S. Pat. No. 3,632,498.

In a preferred process, hydrated ruthenium chloride ($RuCl_3 \cdot 3H_2O$) is dissolved in isopropyl alcohol to form a solution having a concentration of one to three percent. Preferably, an enhancing agent, such as a chloride of tantalum, is added to the solution. A mixture having an atomic ratio of about one ruthenium atom to three tantalum atoms produces a higher capacitance film than do mixtures with different ratios of tantalum to ruthenium atoms. The rate of dissolution of the chlorides in alcohol can be increased by the addition of about 10 milliliters of hydrochloric acid per 100 milliliters of isopropyl alcohol. Titanium, nickel, and zirconium compounds may also be used in place of the tantalum chloride to improve performance of the capacitors according to the invention. While the preferred process employs chlorides because of their solubility, other inorganic and organic salts of the metals can also be employed in the formation of the porous coating.

Whether the substrate on which the porous coating is disposed is a metal body or the inside surface of a metal capacitor container, the substrate is preferably roughened before deposition of the coating to increase the adhesion of the solution subsequently applied to the substrate in forming the coating. The surface may be roughened by chemical treatment, for example, with sulfuric acid, hydrochloric acid, or oxalic acid, or by a mechanical process, such as sand blasting, although mechanical processes are not preferred over chemical treatments. The tantalum or titanium substrate is then heated to about 85° C. and the solution is applied. The elevated temperature of the substrate results in rapid evaporation of the alcohol solvent, leaving the formerly dissolved chlorides in place as a film on the substrate.

After the formation of the metallic chloride film, the substrate is heated to a temperature of about 250° C. in air to drive off any remaining solvent and the water contained in the hydrated chloride. In addition, some of the chlorine may be driven off at that time. The heating continues in air for about one hour after which the temperature is increased to approximately 300° C. for a time sufficient to oxidize the metal components of the coating. For example, the oxidizing treatment in air may continue for about two hours. The resulting coating is insoluble in water and sulfuric acid, has pores as small as 5 nanometers, and has a surface area of up to about 120 square meters per gram.

The completed capacitor includes a fluid electrolyte 14, shown in FIG. 2, disposed between and in contact with both of the electrodes to provide a current path between the electrodes 6 and 11 or 6 and 13. The fluid electrolyte may be any of the conventional electrolytes employed in capacitors, most typically a sulfuric acid solution when the anode is tantalum. In other constructions, different electrolytes are used. For example, when the anode is aluminum, an ammonium salt dissolved in a non-aqueous solvent, such as glycol or a glycol-like solvent, may be employed because sulfuric acid attacks aluminum. When the cathode is nickel, then an aqueous solution of potassium hydroxide is preferred over sulfuric acid as an electrolyte. As is conventional, the materials of construction of the capacitor that are contacted by the electrolyte are chosen to be impervious or extremely resistant to the effects of the particular electrolyte employed.

The embodiments of the capacitor according to the invention shown in FIGS. 1 and 2 are similar in shape and arrangement to conventional tantalum wet slug capacitors. Other embodiments of the invention resemble the "jelly roll" structure of conventional foil capacitors. In that configuration, the anode slug is replaced by a conventional foil of tantalum or aluminum, or any of the other valve metals, wound in jelly roll fashion as the anode. Some decrease in capacitance is experienced in replacement of the anode slug with the rolled foil. However, an increased capacitance over the conventional jelly roll foil capacitors is achieved in the invention because of the presence of the cathode including the porous coating.

Capacitor cells of still different geometrical configuration according to embodiments of the invention can be easily made. The capacitors cells can be interconnected in series to form a capacitor having a higher breakdown voltage than an individual cell. An example of an embodiment of the invention including a single cell is shown in FIG. 3. A capacitor according to an embodiment of the invention and including a plurality of cells arranged and interconnected serially is shown in FIG. 4.

In FIG. 3, a capacitor according to an embodiment of the invention includes opposed metal bodies 21 and 22, preferably thin metal plates or foils. The plates are separated by an insulating sealant 23 that is adhered to both of the plates 21 and 22. FIG. 3 (and FIG. 4) is a sectional view and the capacitor can have any desired shape in plan. For example, if the capacitor has a circular shape in plan view, then preferably the sealant 23 is a unitary, annular body adhered to both plates, sealing and forming a sealed package. If the capacitor has other shapes in plan view, it is still preferred that the sealant 23 be a unitary body following the perimeter of the plates, i.e., the capacitor, defining a closed volume between the two plates 21 and 22. The sealant may extend beyond the plates. The sealant may be a laminate of resin layers that are thermally sealed to each other.

The plates 21 and 22 are preferably tantalum, although other metals, such as titanium, may be employed. A porous tantalum anode 24 or an anode of another valve metal is formed on plate 21 and disposed within the sealed volume defined by the plates 21 and 22 and the sealant 23. The inside surface of the plate 22 is coated with a porous coating including a metal oxide prepared as described above, thereby forming a pseudocapacitor cathode. In order to avoid direct contact between the anode 24 and the porous coating on the inside surface of the plate 22, a spacer is interposed between the anode 24 and the plate 22. Most preferably, the spacer includes a plurality of masses of an electrically insulating material disposed between and contacting the anode 24 and the plate 22. A fluid electrolyte 26, such as a solution of sulfuric acid, potassium hydroxide, or an ammonium salt, is present between and in contact with the anode 24 and the plate 22. The electrolyte 26 directly contacts the spacer 25 so that the spacer material must be impervious to the electrolyte.

In the capacitor of FIG. 3, the plate or metal body 22 has a porous coating including a metal oxide formed on one surface in the same manner that the porous coating is formed on metal body 11 or on the inside surface of the container 1 of the embodiments of the invention already described. After the formation of that porous coating, the spacer 25 is deposited on the porous coating. The individual spacing masses may be formed by printing, such as silk screening, while dissolved in a solvent that is subsequently removed, for example, by the application of heat, or by the deposition of individual masses of a melted electrically insulating material. If the electrolyte is sulfuric acid, then the spacer may be made of polyolefin, polyethylene, or polypropylene, for example. Other kinds of spacers can be employed instead of the individual masses illustrated in FIG. 3. For example, a glass fiber paper, plastic fibers, or an ion-permeable material, such as NAFION, may be inserted between the anode 24 and the plate 22 to prevent direct contact of the electrodes. The spacing masses may be located on the anode 24 rather than on the porous coating or may not be fixed to either electrode.

The plate 21, which is preferably the same size and shape as the plate 22, is masked over the area where the sealant 23 will be adhered. Plate 21 may be a thin metal foil, for example, 0.001 inch (25 micrometers) in thickness. Tantalum powder held together by a binder, such as stearic acid, if needed, is applied to the plate 21 under pressure. The tantalum powder binder is driven off, for example, by heat, and the powder is sintered in an inert atmosphere to produce a high surface area porous anode. Finally, that anode is anodically oxidized to form tantalum oxide over the surface of the sintered powder to a desired thickness. Similar anodes may be made of aluminum, niobium, zirconium, and titanium.

The plates 21 and 22 are then brought together with the spacer 25 preventing direct contact of the plate 22 and the anode 24. The spacer masses may be about 0.001 inch (25 micrometers) high, 0.005 inch (125 micrometers) in diameter, and spaced about 0.050 inch (1.25 millimeters) apart in a regular pattern. In order to form a stable assembly, the sealant 23 is then applied at the periphery of the two plates 21 and 22 to form a closed package retaining the fluid electrolyte 26. A hot melt polyolefin or epoxy may be employed as the sealant 23. Subsequently, the sealant can be broken or opened so that the fluid electrolyte 26 can be injected into the package. The interior of the package may be evacuated in advance of injecting the electrolyte. After the fluid electrolyte is in place, the sealant is resealed with additional sealant material. Leads can be easily attached to the plates 21 and 22 before, during, or after assembly of the capacitor.

A capacitor according to an embodiment of the invention and including a plurality of individual capacitor cells 30 interconnected in series is illustrated in FIG. 4. The serial arrangement of the cells 30 is terminated at opposite ends of the arrangement by plates 21 and 22, respectively. With the exception of those two plates, which are identical to the corresponding elements of the capacitor shown in FIG. 3, the remainder of the capacitor units in the capacitor of FIG. 4 are identical cells 30. Since plate 22 on which spacers 25 are disposed and plate 21 on which the anode 24 is formed have already been described, no repetition of the description of those elements is required.

Each cell 30 includes a bipolar metal plate or metal body 31. On one side of the metal body 31, a porous coating including a metal is formed in accordance with the preceding description. For example, a porous ruthenium oxide film containing tantalum oxide may be present on one side of the plate 31. Electrically insulating spacing masses 32 are disposed in a pattern on that porous oxide coating. A porous tantalum anode 33, or an anode of a different material, is formed on the opposite side of the plate 31, completing the bipolar element of the cell 30. Generally, the anode 33 is formed first while a mask is present on the opposite side of the plate 31 to prevent the formation of excessive tantalum oxide. After the anode is completed, the mask is removed and the oxide coating is formed on the side of the plate 31 opposite the anode. Thereafter, the spacer masses 32 are formed on the oxide coating. Finally, the sealant 34 is applied to one side of the plate 31, completing the cell 30. The order of the fabrication steps can be changed and the spacing masses can be formed on the anode rather than on the oxide coating provided appropriate changes are made in the cells at the ends of the serial arrangement.

The cells are then assembled by attaching the sealant to the plates of adjacent cells. The sealant may extend beyond individual cells and may merge into a single body along the whole length of the capacitor. The sealant may include laminated resin layers that are heat sealed together beyond the edges of the plates 31. After the serial arrangement of the unit cells is assembled, the end units, i.e., the plate 21 with the attached anode 24 and the plate 22 with the attached spacer masses 25 on the porous coating, are applied to opposite ends of the serial arrangement of identical unit cells to complete the mechanical assembly of the capacitor. A fluid electrolyte is added to each of the cells through openings made in the sealant. The volume occupied by the electrolyte may be evacuated before the electrolyte is introduced. After injection of the electrolyte, the sealant is again closed, completing the capacitor.

When a capacitor like the embodiment shown in FIG. 4 includes a number of cells, it is not always possible to produce cells having identical characteristics. Particularly in capacitors according to the invention, where one electrode of each cell is significantly different in one or more of capacitance, resistance, and leakage current from the other electrode of that cell, excessive voltages may be applied to various cells. In order to avoid application of excessive voltages, a resistor, such as the resistors 35 illustrated in FIG. 4, can be connected across the plates of each cell. If resistors are so employed, one such resistor should be connected across each pair of metal plates in the entire serial arrangement rather than the partial connection shown in FIG. 4 which is shown only for illustrative purposes. The resistors should each have essentially the same resistance and provide a current path carrying substantially more current, for example, larger by a factor of ten, than the leakage current that flows through the capacitor. Although the resistors 35 are illustrated as discrete elements in FIG. 4, distributed resistors between adjacent capacitor plates can be provided by employing a sealant with a desired, finite resistivity. Alternatively, an electrically conducting paint can be applied to the sealant in one or more stripes interconnecting the capacitor plates, i.e., electrodes, of the capacitor embodiments of FIGS. 3 and 4.

Figure 5:
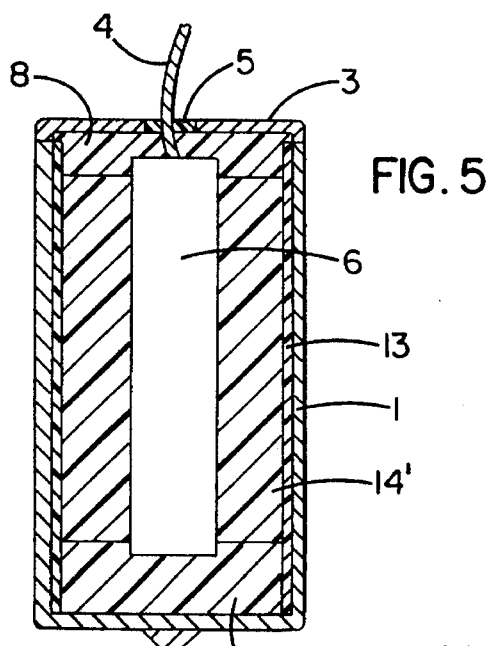
FIG. 5 is a cross-sectional view of an alternative embodiment of a capacitor according to the invention.
Figure 6:
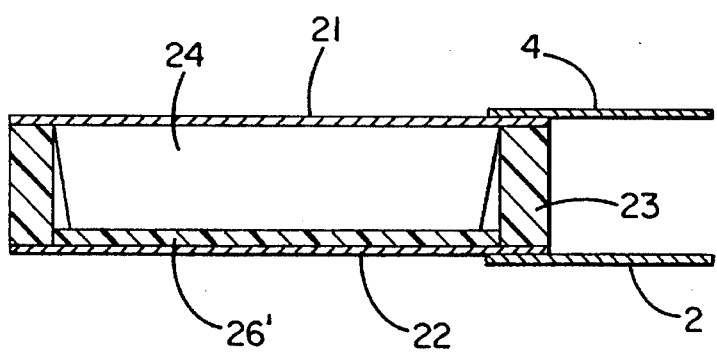
FIG. 6 is a cross-sectional view of a single cell prismatic capacitor according to an embodiment the invention.

FIG. 5 illustrates an alternative embodiment of a capacitor according to the invention. The structure of FIG. 5 is identical to the structure of FIG. 2 with the exception of the electrolyte. In the structure of FIG. 2, the electrolyte 14 is a fluid. In the capacitor embodiment of FIG. 5, the electrolyte 14' is a solid electrolyte, such as polypyrrole, NAFION (an ion permeable, electron impermeable commercially available material), and polyaniline, and including semi-solids, such as the aqueous electrolyte solutions already described with silica added to form a gel. Similarly, FIG. 6 shows in cross-section another capacitor embodiment according to the invention. Although a similar capacitor embodiment shown in FIG. 3 includes a fluid electrolyte 26, in the embodiment of FIG. 6, the electrolyte 26' is a solid electrolyte. The electrolyte 26' acts as a spacer, eliminating the need for the spacing masses 25 employed in the embodiment of FIG. 3. In addition, the presence of the solid electrolyte 26' eliminates the need for the sealant or container 23 separating the plates 21 and 22 and retaining the fluid electrolyte since the solid electrolyte does not flow nor evaporate. In other words, in a capacitor according to the invention employing a solid electrolyte, no container is necessary.

Figure 7:
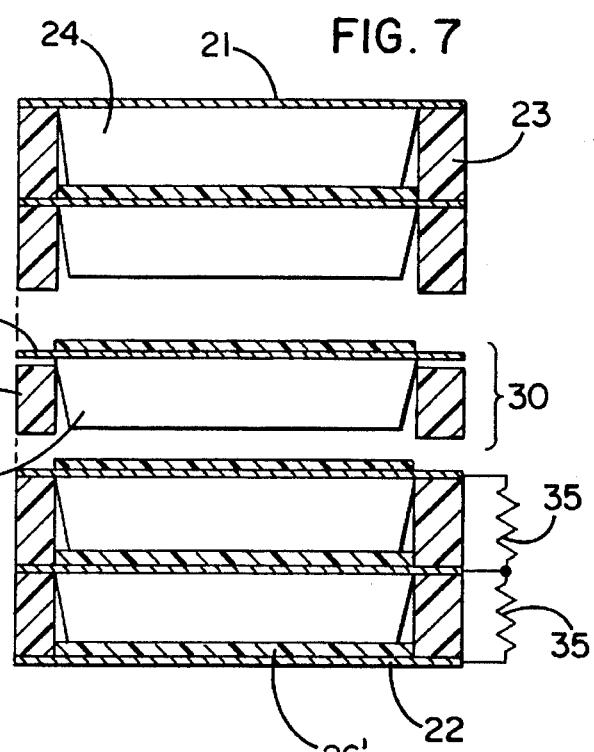
FIG. 7 is a cross-sectional view of a multiple cell prismatic capacitor according to an embodiment of the invention.

FIG. 7 illustrates a capacitor made by laminating multiple cells of the type individually illustrated in FIG. 6 and employing a solid electrolyte 26'. Although each capacitor cell 30 includes a sealant 34 defining a container, as discussed above, a container is not necessary when the capacitor cell includes the solid electrolyte 26' disposed between each electrode pair including an anode and a cathode. The solid electrolyte also functions as a spacer, keeping those electrodes apart, thereby preventing short-circuiting.

Figure 8:
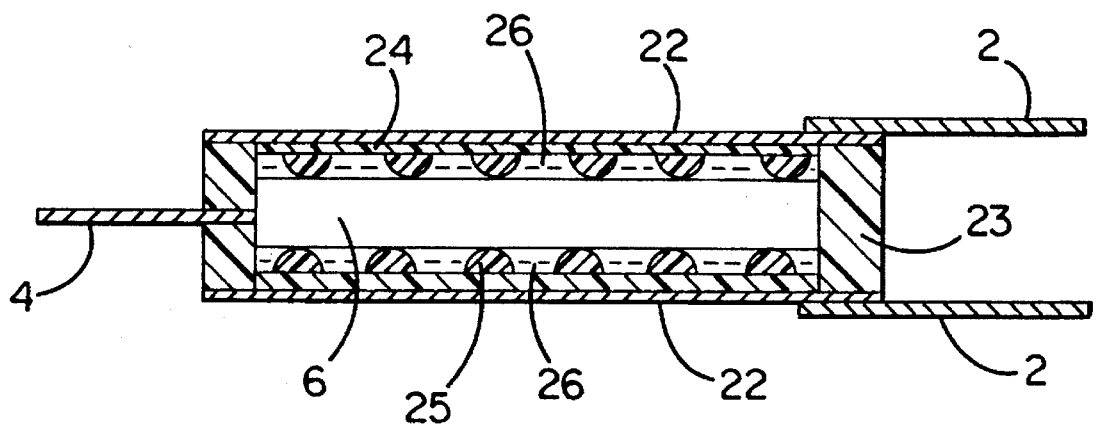
FIG. 8 is a cross-sectional view of an alternative embodiment of a capacitor according to the invention.

FIG. 8 is a sectional view of still another embodiment of the capacitor according to the invention. The capacitor of FIG. 8 includes opposed metal plates or foils 22. The porous coating 24 of one or more metal oxides functioning as a cathode is disposed on one of the surfaces of each of the metal plates or foils 22. The porous coatings 24 face each other. A conventional valve metal capacitor anode 6, such as anodically oxidized tantalum, is disposed between and spaced from the porous coatings 24. The space between the porous coatings 24 and the anode 6 is filled with an electrolyte. If that electrolyte is a fluid 26, as shown in FIG. 8, any of the fluid electrolyte mixtures described above, such as aqueous solutions of sulfuric acid or potassium hydroxide or ammonium salts dissolved in glycol may be employed as the electrolyte. The choice of the electrolyte, as in the other capacitor embodiments, depends upon the composition of other materials employed in the capacitor. The materials chosen must be compatible so that no element is unduly attacked by another material that is present, thereby shortening the life of the capacitor. When a liquid electrolyte is used, it is desirable to include spacers 25 between the porous coatings 24 and the anode 6 to avoid direct contact. The same kinds of spacers as described above can be used, e.g., polymeric masses, NAFION films, or another insulating material that resists attack by the electrolyte, in order to maintain the desired spacing between the oxide coatings and the anode. Alternatively, the electrolyte can be a solid electrolyte 26', such as a solid mass of NAFION, polyaniline, or polypyrrole, which eliminates the need for spacers 25. Preferably, the metal plates 21 are separated by a peripheral sealant 23 that also encloses the anode and the electrolyte. The plates 22 together are electrically connected together as the cathode of the capacitor and an anode connection is made by a wire passing through the sealant 23. As in other sectional views of embodiments of the invention described here, FIG. 8 does not indicate the geometry of the capacitor embodiment in a plan view. That plan view geometry can be any arbitrary shape, e.g., a circle, a rectangle, or a star shape, to fit a particular application. When a solid electrolyte is employed in the capacitor embodiment of FIG. 8, the sealant 23 is not necessary, at least in particular applications of the capacitor.

Figure 9:
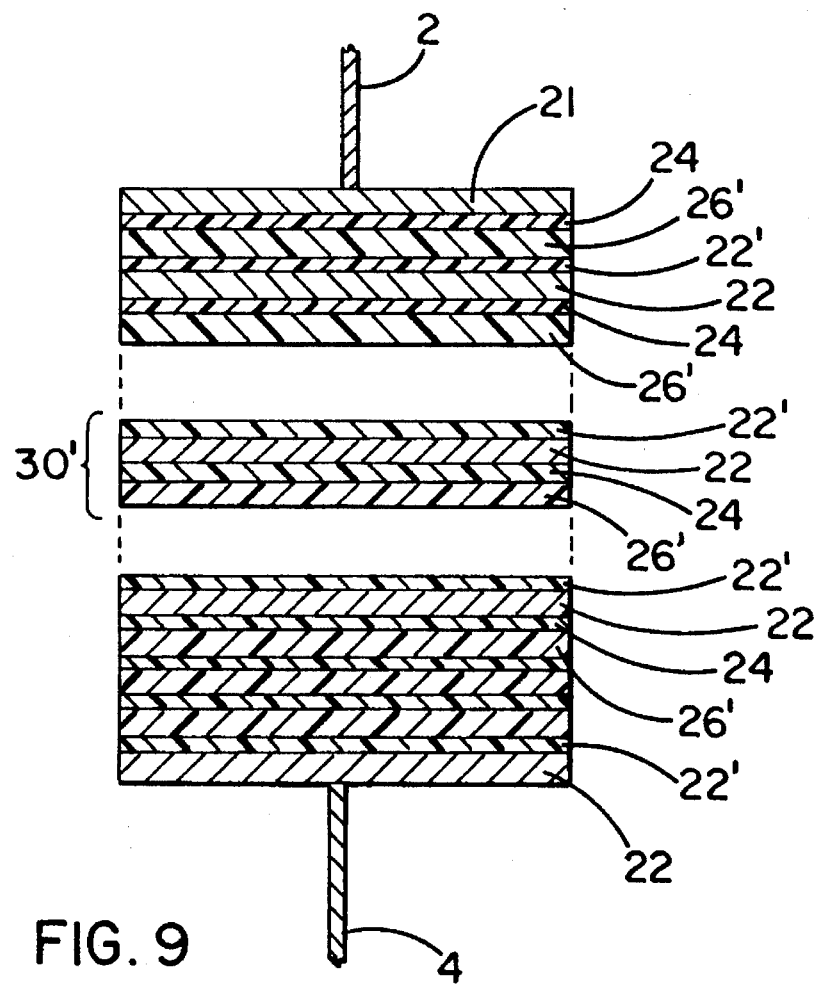
FIG. 9 is a cross-sectional view of a multiple cell prismatic capacitor according to an embodiment of the invention.

Still another embodiment of a capacitor according to the invention is illustrated in a cross-sectional view in FIG. 9. That capacitor includes a unit cell 30'. Multiple unit capacitor cells 30' are stacked on each other to form a capacitor with a cathode assembly at one end and an anode assembly at the other end. The capacitor cell 30' includes a metal foil 22 on one side of which an electrically insulating oxide film 22' is disposed and on the other side of which a porous coating 24, of the type previously described herein including at least one metal oxide is disposed as a cathode. A solid electrolyte 26' is in contact with the porous coating 24 opposite the metal foil 22. The solid electrolyte may be any of the electrolytes previously discussed here, including polypyrrole, NAFION, and polyaniline as well as other suitable solid electrolytes. Most preferably, the metal plate 22 is a thin aluminum foil having an appropriate configuration to provide a large surface area. For example, a preferred foil is a high etch ratio aluminum foil in which the effective surface area is increased by chemical treatment, for example, by 30 to 50 and even 100 times as compared to the projected area of the foil. Such foils are available from Kawatake Electronics Co., Ltd., Tokyo, Japan. The oxide film on the plate or foil 22' can be readily formed by conventional techniques, such as anodic oxidation of the aluminum film.

In practice, a number of the unit cells 30' are manufactured and then laminated in a stack to form a capacitor body. At the end of the stack terminating an electrically insulating oxide layer 22', a cathode structure including a metal foil 21, such as the high etch ratio aluminum foil, a porous coating 24 forming a cathode disposed on the foil, and a solid electrolyte 26' opposite the aluminum foil 21 of a unit cell 30' is arranged. A cathode lead 2 extends from the aluminum foil 20 of the cathode structure. The electrolyte 26' is in contact with the electrically insulating oxide 22' exposed at the end of the stack of unit cells. At the opposite end of the stack another metal plate or foil 22' bearing an oxide is arranged. The oxide of that anode structure is in contact with the solid electrolyte 26' that is exposed at the end of the stack. An anode lead 4 extends from the aluminum foil 22 of the anode structure. Together, the unit cells and the cathode and anode assemblies form a capacitor that has a variable capacitance depending upon a number of unit cells 30' that are included in the laminated stack.

The invention has been described with respect to certain preferred embodiments. Various additions and modifications within the spirit of the invention will be apparent to those of skill in the relevant arts. Accordingly, the scope of the invention is limited solely by the following claims.

I claim:

1. A capacitor comprising:

a cathode comprising a porous coating including an oxide of at least one metal selected from the group consisting of ruthenium, iridium, nickel, rhodium, platinum, palladium, and osmium;

an anode spaced from the porous coating and including a metal selected from the group consisting of tantalum, aluminum, niobium, zirconium, and titanium;

a solid electrolyte disposed between and in contact with the porous coating and the anode and selected from the group consisting of polypyrrole, NAFION, polyaniline, and a gel of an aqueous electrolyte and silica; and a container containing the anode and the electrolyte and on which porous coating is disposed.

2. The capacitor of claim 1 wherein the container comprises a metal.

3. The capacitor of claim 1 wherein the anode is porous sintered tantalum having an oxide coating.

4. The capacitor of claim 1 wherein the anode is aluminum coated with an oxide of aluminum.

5. The capacitor of claim 1 wherein the porous coating includes a mixture of at least one oxide chosen from the group consisting of oxides of ruthenium, iridium, nickel, rhodium, platinum, palladium, and osmium and at least one oxide chosen from the group consisting of oxides of tantalum, titanium, and zirconium.

6. The capacitor of claim 1 wherein the porous coating includes a mixture of oxides of ruthenium and tantalum.

7. The capacitor of claim 1 wherein the container comprises a first metal body on which the porous coating is disposed, a second metal body spaced from the porous coating and on which the anode is disposed opposite the first metal body.

8. The capacitor of claim 7 wherein the container includes a sealant disposed between and contacting the first and second metal bodies.

9. A capacitor comprising:

a plurality of capacitor cells, each cell including:

a first metal body having opposed first and second surfaces; a cathode comprising a porous coating including an oxide of at least one metal selected from the group consisting of ruthenium, iridium, nickel, rhodium, platinum, palladium, and osmium disposed on the first surface of said first metal body; an anode including a metal selected from the group consisting of tantalum, aluminum, niobium, zirconium, and titanium disposed on the second surface of the first metal body; and a solid electrolyte in contact with the cathode opposite the first metal body wherein the plurality of capacitor cells are disposed in a serial arrangement, the solid electrolyte of one cell contacting the second surface of the first metal body of the next adjacent cell;

a second metal body having first and second opposed surfaces disposed at one end of the serial arrangement and including a cathode comprising a porous coating including an oxide of at least one metal selected from the group consisting of ruthenium, iridium, nickel, rhodium, platinum, palladium, and osmium disposed on one side of the second metal body and opposite an anode of a first metal body in the serial arrangement, but no anode, and functioning as a cathode of the capacitor and the solid electrolyte disposed between and contacting the porous coating of the second metal body and the anode of the opposite first metal body in the serial arrangement; and a third metal body having first and second opposed surfaces and disposed at the other end of the serial arrangement and including an anode comprising a metal selected from the group consisting of tantalum, aluminum, niobium, zirconium, and titanium disposed on one side of the third metal body and opposite a porous coating of a first metal body in the serial arrangement, but no porous coating, and functioning as an anode of the capacitor and the solid electrolyte disposed between and contacting the anode of the fourth metal body and the porous coating of the opposite first metal body in the serial arrangement.

10. The capacitor of claim 9 wherein each anode is a porous sintered tantalum body coated with an oxide of tantalum.

11. The capacitor of claim 9 wherein the porous coating includes a mixture of at least one oxide chosen from the group consisting of oxides of ruthenium, iridium, nickel, rhodium, platinum, palladium, and osmium and at least one oxide chosen from the group consisting of oxides of tantalum, titanium, and zirconium.

12. The capacitor of claim 9 wherein the porous coating includes a mixture of oxides of ruthenium and tantalum.

13. The capacitor of claim 9 including means for electrically interconnecting said first, second, and third metal bodies in series.

14. The capacitor of claim 9 wherein the electrolyte is a fluid.

15. The capacitor of claim 9 wherein the electrolyte is a solid selected from the group consisting of polypyrrole, NAFION, polyaniline, and a gel of an aqueous electrolyte and silica.

* * * * *